United States Patent
Lazaridis et al.

(10) Patent No.: US 8,260,247 B2
(45) Date of Patent: Sep. 4, 2012

(54) PORTABLE ELECTRONIC DEVICE AND METHOD OF OPERATION

(75) Inventors: Mihal Lazaridis, Waterloo (CA); Michael Thomas Winkler, Kitchener (CA); Christopher Pattenden, Waterloo (CA)

(73) Assignee: Research In Motion Limited, Waterloo (CA)

( * ) Notice: Subject to any disclaimer, the term of this patent is extended or adjusted under 35 U.S.C. 154(b) by 60 days.

(21) Appl. No.: 12/840,370

(22) Filed: Jul. 21, 2010

(65) Prior Publication Data
US 2012/0021777 A1    Jan. 26, 2012

(51) Int. Cl.
*H04W 88/02*    (2009.01)
(52) U.S. Cl. ...................................................... 455/400
(58) Field of Classification Search ................ 455/456.4
See application file for complete search history.

(56) References Cited

U.S. PATENT DOCUMENTS

| | | | |
|---|---|---|---|
| 6,502,022 | B1 | 12/2002 | Chastain et al. |
| 2005/0255874 | A1 | 11/2005 | Stewart-Baxter et al. |
| 2006/0099940 | A1 | 5/2006 | Pfleging et al. |
| 2006/0240860 | A1 | 10/2006 | Benco et al. |
| 2007/0072553 | A1 | 3/2007 | Barbera |
| 2007/0281603 | A1 | 12/2007 | Sanjeev et al. |
| 2009/0215466 | A1 | 8/2009 | Ahl et al. |
| 2011/0112717 | A1* | 5/2011 | Resner ........................ 701/33 |

FOREIGN PATENT DOCUMENTS

| | | |
|---|---|---|
| EP | 2104380 A2 | 9/2009 |
| WO | WO 2004/019646 A1 | 3/2004 |
| WO | WO2009064132 | 5/2009 |

OTHER PUBLICATIONS

Partial European Search Report—Mar. 7, 2011; EP10170334.6, 6 pages.
Prevent Distracted Driving—Zoomsafer; "Focused Drivers are Safe Drivers"; http://www.zoomsafer.com; At least as early as Feb. 8, 2010; 2 pages.
Your Personal Safe Driving Assistant—Zoomsafer; "Distracted Driving is a leading cause of accidents. Protect your family on the road"; http://www.zoomsafer.com/personal.aspx; At least as early as Feb. 8, 2010; 3 pages.
Zoomsafer—Distracted Driving: What it means for your corporation; "Distracted Driving: Understanding your business risk and liability"; At least as early as Jan. 2010; 14 pages
Cellcontrol:How it works!; "No Self-Control?; Get Cellcontrol"; http://www.cellcontrol.com/how.html; At least as early as Feb. 8, 2010.
Extended European Search Report—EP Application No. 10170334. 6; Jul. 4, 2011.

* cited by examiner

*Primary Examiner* — Diane Mizrahi
(74) *Attorney, Agent, or Firm* — Ridout & Maybee LLP (57) ABSTRACT

A method and portable electronic device for hands-free operation in a motor vehicle are described. In accordance with one embodiment, there is provided a method comprising: detecting when a portable electronic device is within a threshold distance of a motor vehicle; and inhibiting the portable electronic device from transmitting communications when the portable electronic device is within the threshold distance of a motor vehicle.

20 Claims, 5 Drawing Sheets

PORTABLE ELECTRONIC DEVICE AND METHOD OF OPERATION

TECHNICAL FIELD

The present disclosure relates to portable electronic devices, including but not limited to, inhibiting operation of portable electronic device, e.g., in a motor vehicle.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants, and laptop computers with wireless 802.11 or Bluetooth capabilities.

Improvements in electronic devices are desirable.

DETAILED DESCRIPTION

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

A method comprises detecting when a portable electronic device is within a threshold distance of a motor vehicle, and inhibiting the portable electronic device from transmitting communications when the portable electronic device is within the threshold distance of a motor vehicle.

A method comprises, via a short-range wireless communication, detecting a hands-free device associated with a motor vehicle, disconnecting any active connection via the short-range wireless communication path when the hands-free device is detected, connecting to the hands-free device via the short-range wireless communication path, engaging hands-free operation between a portable electronic device and the hands-free device.

A portable electronic device comprises a communication subsystem and a processor configured to, via a short-range wireless communication path, detect a hands-free device associated with a motor vehicle, disconnect any active connection via the short-range wireless communication path when the hands-free device associated is detected, connect to the hands-free device via the short-range wireless communication path, engage hands-free operation via the communication subsystem.

The disclosure generally relates to an electronic device, for example, a portable electronic device. Examples of portable electronic devices include mobile, or handheld, wireless communication devices such as pagers, cellular phones, cellular smart-phones, wireless organizers, personal digital assistants, wirelessly enabled notebook computers, and so forth. Alternatively, the portable electronic device may be a portable electronic device without wireless communication capabilities, such as a handheld electronic game device, digital photograph album, digital camera, or other device.

Figure 1:
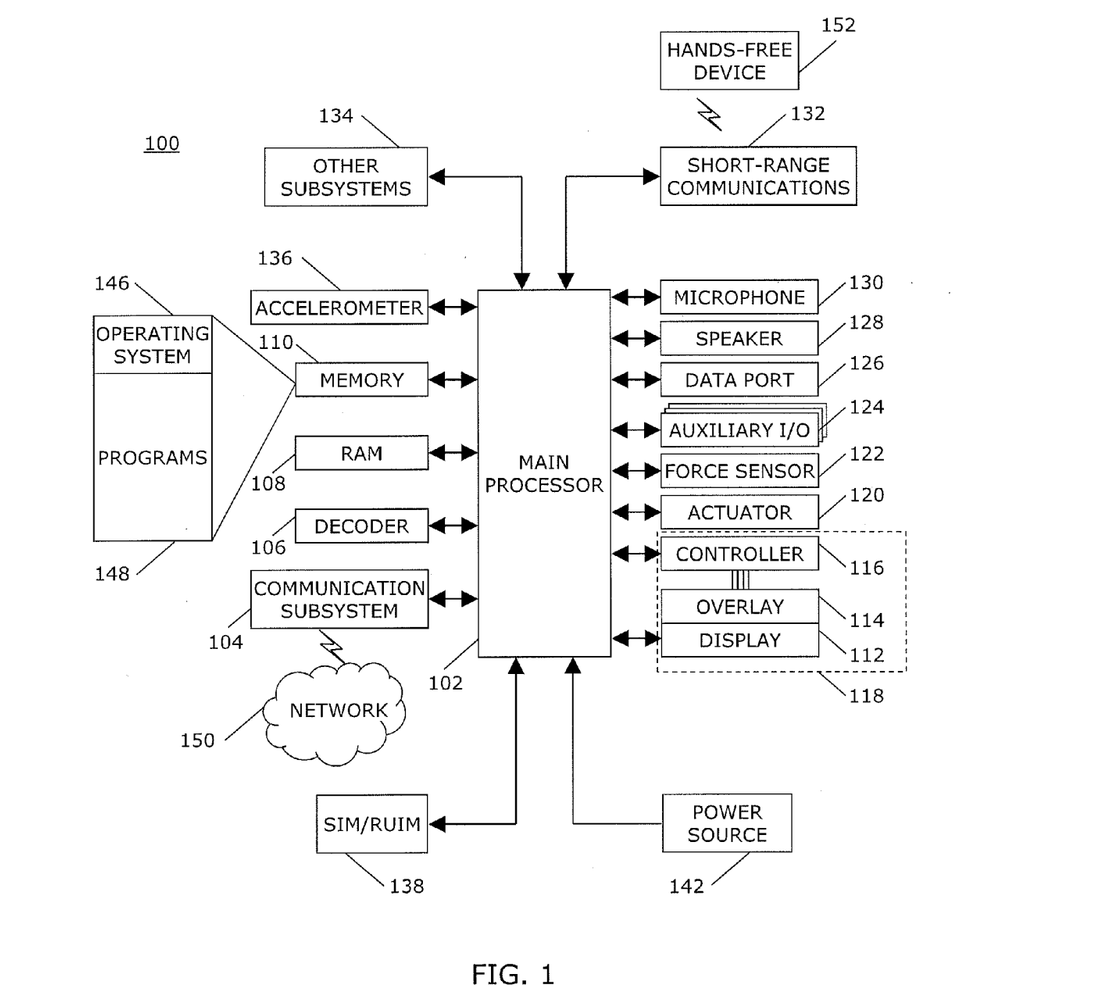
FIG. 1 is a block diagram of a portable electronic device in accordance with the disclosure.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably coupled to an electronic controller 116 that together comprise a touch-sensitive display 118, one or more actuators 120, one or more force sensors 122, one or more auxiliary input/output (I/O) subsystems 124, a data port 126, a speaker 128, a microphone 130, short-range communications subsystem 132, and other device subsystems 134. User-interaction with a graphical user interface is performed through the touch-sensitive overlay 114. The processor 102 interacts with the touch-sensitive overlay 114 via the electronic controller 116. Alternatively or additionally, input may be provided via one or more control keys, a keyboard or keypad, navigation device, or any combination thereof. Information, such as text, characters, symbols, images, icons, and other items that may be displayed or rendered on a portable electronic device 100, is displayed on the touch-sensitive display 118 via the processor 102.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software applications or programs 148 that are executed by the processor 102 and are typically stored in a persistent, updatable store such as the memory 110. Additional applications or programs 148 may be entered into the portable electronic device 100 through the wireless network 150, the auxiliary I/O subsystem(s) 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
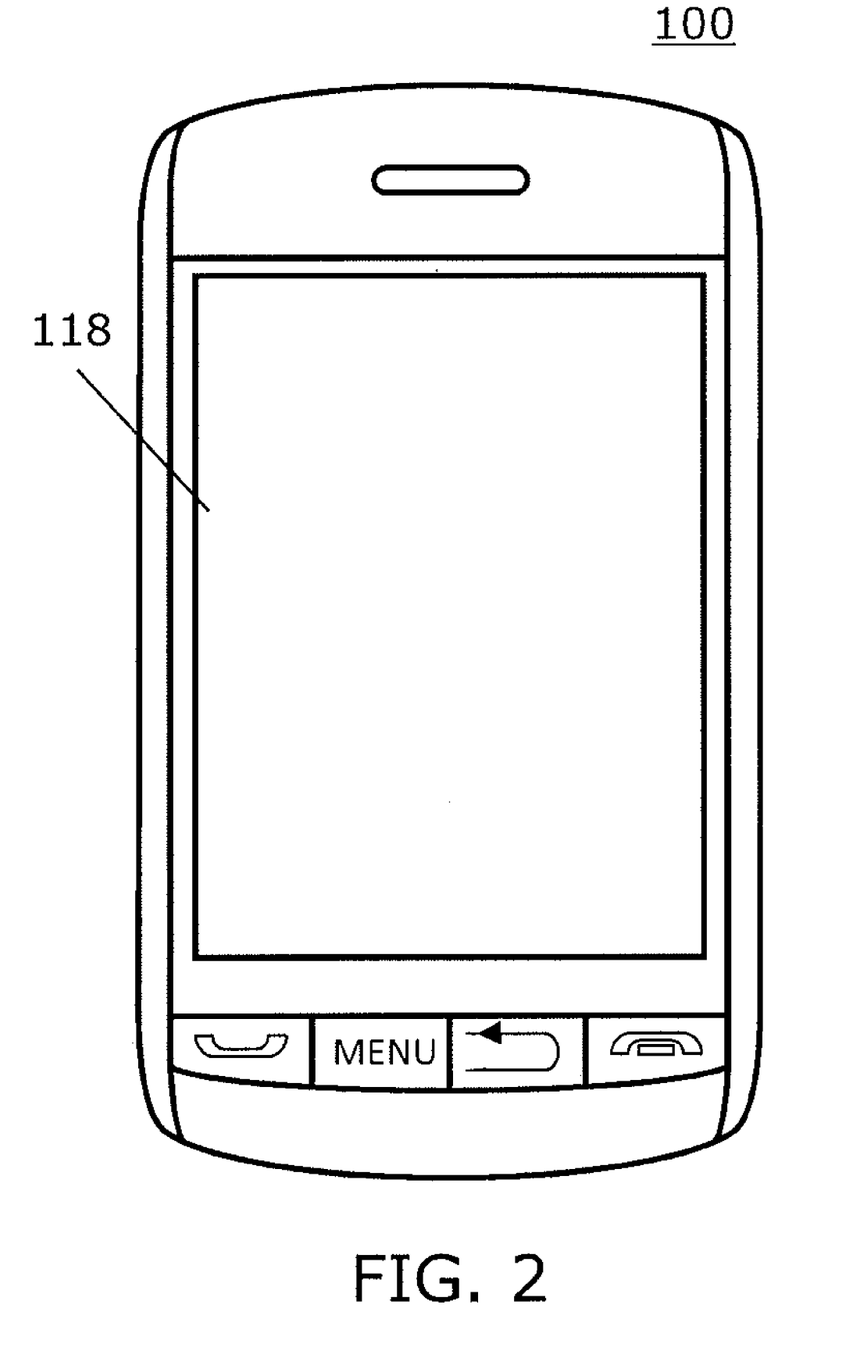
FIG. 2 is a front view of an example portable electronic device in a portrait orientation in accordance with the disclosure.

A front view of an example of a portable electronic device 100 in portrait orientation is shown in FIG. 2. The portable electronic device 100 includes a housing that houses components, such as shown in FIG. 1, and frames the touch-sensitive display 118. Any suitable number of selectable features may be rendered on the touch-sensitive display 118, for example, virtual buttons, menu options, keys of a keyboard, and so forth.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may comprise multiple layers in a stack including, for example, a substrate, a ground shield layer, a barrier layer, one or more capacitive touch sensor layers separated by a substrate or other barrier, and a cover. The capacitive touch sensor layers may comprise any suitable material, such as indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

One or more actuators 120 may be depressed or activated by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback.

The auxiliary I/O subsystems 124 may include other input devices such as one or more control keys, a keyboard or keypad, navigation device, or any combination thereof. The navigation device may be a depressible/clickable trackball, a depressible/clickable scroll wheel, a touch-sensitive optical trackpad, or a touch-sensitive touchpad.

Figure 3:
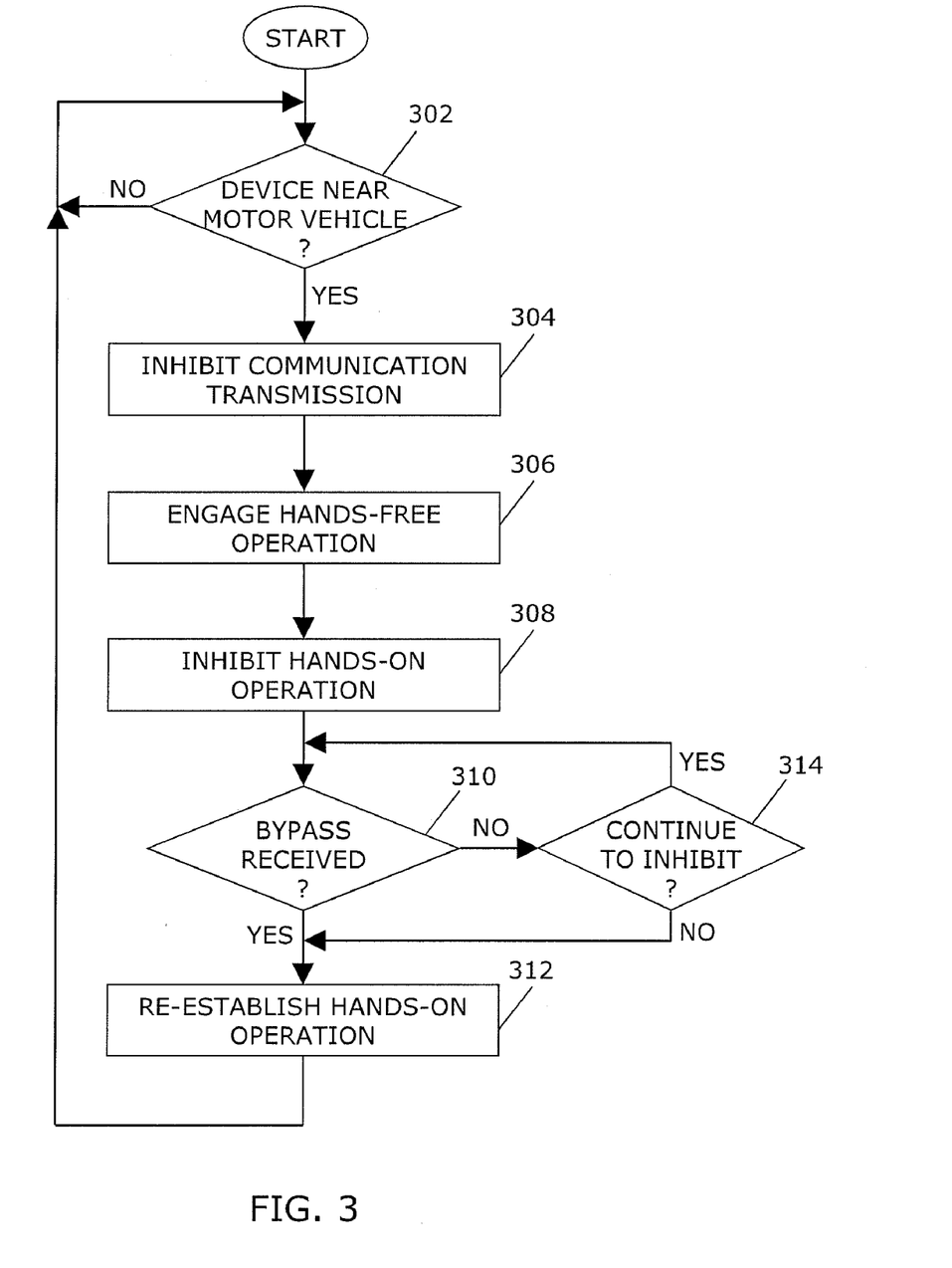
FIG. 3 is a flowchart illustrating a method of operation of a portable electronic device in accordance with the disclosure.

A flowchart illustrating an example embodiment of a method of hands-free operation of a portable electronic device 100 in a motor vehicle is shown in FIG. 3. The method may be carried out by software executed, for example, by the processor 102. Coding of software for carrying out such a method is within the scope of a person of ordinary skill in the art given the present disclosure. The method may contain additional or fewer processes than shown and/or described, and may be performed in a different order. Computer-readable code executable by at least one processor 102 of the portable electronic device 100 to perform the method may be stored in a computer-readable medium such as the memory 110. The computer-readable code may be part of the operating system 146, a part of an application, or a stand-alone application.

The portable electronic device 100 detects when it is within a threshold distance of a motor vehicle, such as an automobile, motorcycle, truck, forklift, motor boat, and so forth. The threshold distance may be predetermined or dynamically determined based on one or more criteria. The threshold distance may be <1 m, 1 m, 2 m, 3 m, 5 m, or any other suitable distance.

Detecting when a portable electronic device 100 is within a threshold distance of a motor vehicle may comprise any one or more of: detecting that a radio of the motor vehicle is turned on, e.g., powered up; detecting a signal for a garage door opener; detecting a wireless remote signal that unlocks a door of the motor vehicle; detecting a wireless remote signal that starts the motor vehicle; detecting starting of an engine or motor of the motor vehicle; detecting vibration of an engine or motor of the motor vehicle, e.g., via an accelerometer; detecting when a speed of the motor vehicle exceeds a speed threshold; or detecting input to the portable electronic device 100, such as activation of a program, entry of a combination of characters and/or input device actuations; selection of a menu option; and so forth. Detection may include detecting that the device 100 remains within the threshold distance for a threshold time period.

The portable electronic device 100 is inhibited 304 from transmitting communications. Inhibiting the portable electronic device 100 from transmitting communications prevents transmission of communications such as voice and data communications. The inhibiting may comprise disabling any or all of the communication subsystem 104, e.g., the transmitter and/or transmitter. The inhibiting may comprise any combination of preventing outgoing voice calls, preventing answering of incoming voice calls, preventing the transmitting of data messages including, but not limited to, email messages, short message service (SMS) text messages, multimedia message service (MMS) messages, instant messages (IMs), peer-to-peer messages, also referred to as a device-to-device messages or PIN messages, and preventing web browsing. Calls such as 911 emergency calls may optionally be permitted.

Hands-free operation of the portable electronic device 100 is engaged 306. The operation of the portable electronic device 100 during hands-free operation may vary. Hands-free operation may comprise any of controlling the portable electronic device 100 by voice commands, performing text-to-speech synthesis for voice or data communications, and so forth. The voice commands may be predetermined or dynamically determined by the content of the user's speech. Text-to-speech synthesis may comprise verbally announcing data items such as data messages, reminders for calendar events, and so forth. A user profile may include one or more hands-free features that are enabled during hands-free operation.

Hands-on operation of the portable electronic device 100 is optionally inhibited at 308. Inhibiting hands-on operation of the portable electronic device 100, also referred to as locking the portable electronic device 100, places restrictions on the portable electronic device 100 that limit the functionality and interaction with the portable electronic device 100. Inhibiting hands-on operation may be initiated automatically when hands-free operation is activated or in response to detection of one or more conditions, such as manual locking of the portable electronic device 100, detecting when the portable electronic device 100 is within the threshold distance of a motor vehicle, selection of a menu option, meeting a user profile condition, closing or holstering of the portable electronic device 100, or other suitable conditions.

The restrictions placed on the portable electronic device 100 may vary. The restrictions may affect one or more of the input devices, e.g., touch-sensitive display 118, or output devices, e.g., display 112. The restrictions placed on the portable electronic device 100 may prevent any combination of any files, messages, or other information from being viewed, any data messages from being composed, browsing of webpages, and so forth. The restrictions generally prevent the entry or display of information via the portable electronic device 100.

Optionally, the portable electronic device 100 may be configured to receive bypass information to re-establish hands-on operation of the portable electronic device 100. When input, such as bypass information, to re-establish hands-on operation the portable electronic device 100 is received, the portable electronic device 100 re-establishes 312 hands-on operation. The bypass information may be entered, for example, by a passenger in the motor vehicle. The bypass information may be a combination of input entered in any combination of in a serial and/or parallel manner. The bypass information may advantageously be difficult to enter, especially, for example, by someone driving a motor vehicle.

The input to re-establish hands-on operation from hands-free operation may be more complex than the input that re-establishes hands-on operation when the portable electronic device 100 is not in hands-free operation. The bypass information that re-establishes hands-on operation from hands-free operation may be a one code, referred to as a hands-free code, and the input that re-establishes hands-on operation when the portable electronic device 100 is not in hands-free operation may be another code, referred to as non-hands-free code. The hands-free code may be more complex than the non-hands-free code, for example, because the hands-free code is longer, has a shorter time threshold for entry, or is more difficult due to locations of input devices on the portable electronic device 100.

A more complex input may comprise symbols rather than letters, simultaneous activation of any combination of keys of a keyboard/keypad, selectable features displayed on the touch-sensitive display 118, and/or other input devices, random information prompted for entry by the device 100 rather than information know to the user, such as a password. The code may be an input sequence selected at random from a predetermined list or a randomly generated input sequence. The code may comprise any combination of entry of characters entered via a touch-sensitive display 118 or a keyboard/keypad, activation of physical controls, such as selecting a volume control or depressing a trackball, and so forth.

Optionally, the bypass information may have associated time thresholds. For example, hands-on operation may be re-established 312 when the hands-free code is entered before one time threshold, or the non-hands-free code is entered before another time threshold that is longer. For example, when the portable electronic device 100 is in hands-free operation, hands-on operation may be re-established when the hands-free code is entered in less time than the shorter time threshold. When the portable electronic device 100 is not in hands-free operation, hands-on operation may be re-established when the code is entered in less time than the longer time threshold.

The portable electronic device 100 may simply inhibit communication transmission, e.g., processes other than processes 302 and 304 are not performed.

Inhibiting transmissions and/or hands-on operation may be discontinued 314, for example, when the portable electronic device 100 is no longer within a threshold distance of a motor vehicle, when an external signal ends the inhibiting process, when the device 100 is powered off, during an emergency 911 call, when at least one condition stored in the device 100 is met, and so forth.

Figure 4:
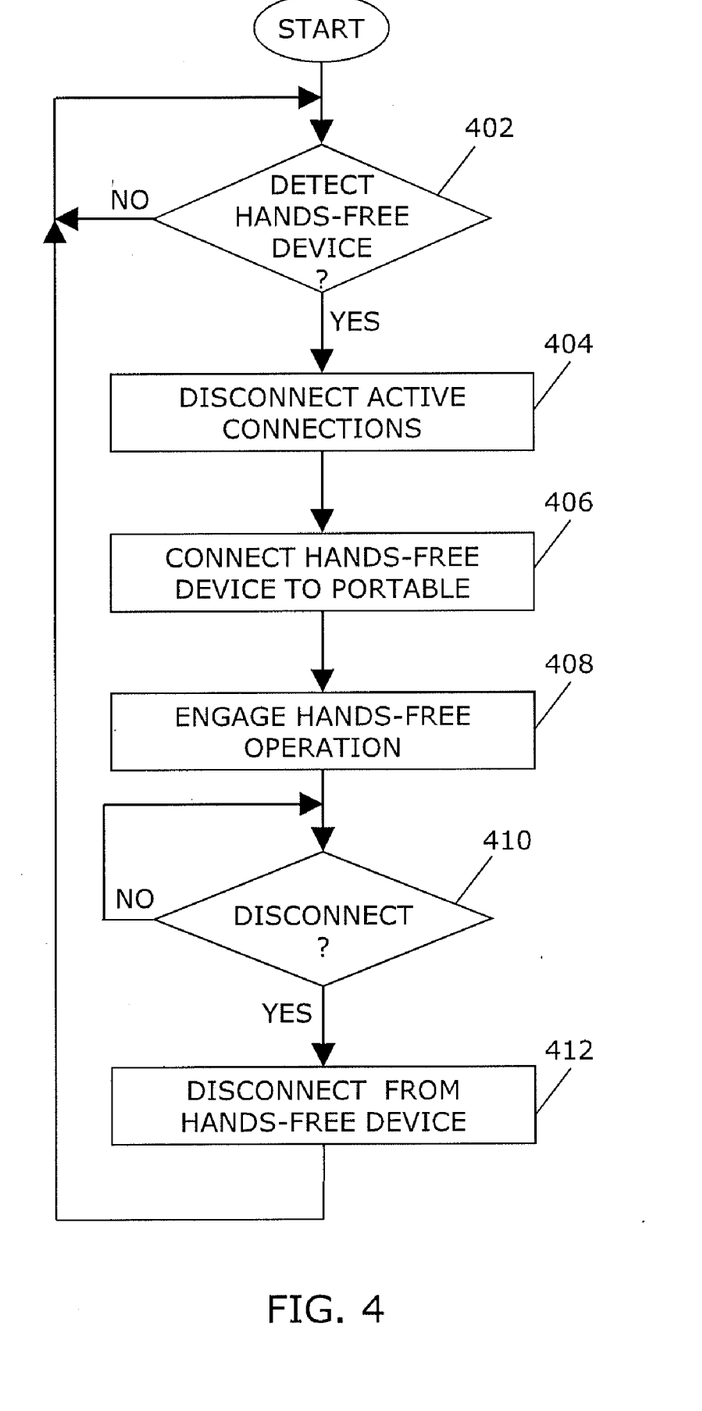
FIG. 4 and FIG. 5 are flowcharts illustrating alternative methods of operation of a portable electronic device in accordance with the disclosure

A flowchart illustrating another example embodiment of a method of hands-free operation of a portable electronic device 100 in a motor vehicle is shown in FIG. 4. In this embodiment, the portable electronic device 100 connects to a hands-free device 152 over a short-range wireless communication path for hands-free operation rather than using hands-free operation on the portable electronic device 100. The method may be carried out by software executed, for example, by the processor 102. Coding of software for carrying out such a method is within the scope of a person of ordinary skill in the art given the present disclosure. The method may contain additional or fewer processes than shown and/or described, and may be performed in a different order. Computer-readable code executable by at least one processor 102 of the portable electronic device 100 to perform the method may be stored in a computer-readable medium such as the memory 110. The computer-readable code may be part of the operating system 146, a part of an application, or a stand-alone application.

Operation of the portable electronic device 100 may be facilitated with a hands-free device 152 that communicates via a short-range communication path between the hands-free device 152 and the electronic device 100, e.g., via the short-range communications subsystem 132. The hands-free device 152 may be a hands-free speakerphone, also known as a "hands-free car kit," that connects wirelessly to the portable electronic device 100. The hands-free speakerphone may comprise a microphone and optionally one or more speakers. Alternatively, the speakerphone may connect wirelessly to a radio or other audio system of the motor vehicle and provide audio through speakers of the motor vehicle. The speakerphone may communicate with the radio with a wireless transmitter. Alternatively, the hands-free device 152 may be a wired or wireless headset, such as an earbud(s) with a microphone or other hands-free device.

The short-range wireless communication path may be part of a wireless personal area network (WPAN) or wireless local area network, and the communication protocol may be compliant, for example, with the IEEE 802.15 standard. The communication protocol may comprise any of an Infrared Data Association (IrDA) protocol, Bluetooth protocol, Ultra-wideband (UWB) protocol, Z-Wave protocol, or ZigBee protocol.

The portable electronic device 100 detects 402 a hands-free device 152, for example, by receiving an identifier of the hands-free device 152 in a wireless communication over a short-range wireless communication path and finding a match of the identifier with one or more identifiers of hands-free devices associated with the portable electronic device 100. For example, the identifiers of hands-free devices may be stored in memory 110 or stored in a remote server accessed via the wireless network 150. The received identifier may be a device name or a Media Access Control (MAC) address associated with the hands-free device. Alternatively, the hands-free device 152 may detect the portable electronic device 100.

When a received identifier is found in a database of identifiers for a hands-free devices associated with a motor vehicle, the hands-free device 152 is determined to be associated with a motor vehicle. The database may comprise identifiers for hands-free devices that may or may not be paired with the portable electronic device 100 and may be stored locally and/or remotely.

The portable electronic device 100 and the hands-free device 152 typically engage in a pairing process prior to hands-free operation. Pairing of a portable electronic device 100 and hands-free device is well known. During pairing, the portable electronic device 100 receives identifying information from the hands-free device 152. Data indicating whether the hands-free device 152 is associated with a motor vehicle may also be received. The identifying information, such as the identifier described above, other information that identifies the hands-free device 152, the nature of the hands-free device 152, e.g., headset or a motor vehicle, and so forth, and the motor vehicle association data may be stored in the portable electronic device 100 remotely, or both. Other data may be exchanged between the portable electronic device 100 and hands-free device 152 during pairing.

Alternatively, detecting the hands-free device 152 may comprise receiving an incoming connection request from a wireless device via a short-range wireless communication path, and detecting the hands-free device when an input is received on the portable electronic device during the incoming connection request. The wireless device may be any device that may connect via the short-range wireless communication path. The input may be identifying information received from a near field communication (NFC) device (not shown). An NFC device may be located in the motor vehicle and communicates with an optional NFC transceiver (not shown) that may be part of the portable electronic device 100 or the hands-free device 152. The NFC transceiver and the NFC device detect one another when they are within range of each other by communicating via the NFC communication path, which is typically a short-range wireless communication path, which may be a different short-range wireless communication path than the one between the hands-free device 152 and the portable electronic device 100. The NFC device may be located anywhere in the motor vehicle, for example, in a glove compartment or console. Alternatively, the input may be a motion gesture detected by an accelerometer of the portable electronic device 100. The motion gesture may be, for example, a tap of the portable electronic device 100 on a solid object.

Alternatively, the input may be generated in response to: detecting that a radio of the motor vehicle is turned on, a garage door opener signal; a wireless remote signal that unlocks a door of the motor vehicle; a wireless remote signal that starts the motor vehicle, detecting starting of an engine or motor of the motor vehicle; detecting vibration of an engine or motor of the motor vehicle via an accelerometer; detecting a speed of the motor vehicle that exceeds a speed threshold; predetermined input such as activation of a program, entry of a combination of characters and/or input device actuations; selection of a menu option; and so forth.

Another option for detecting the hands-free device 152 includes receiving an incoming connection request from a wireless device via the short-range wireless communication path and detecting the hands-free device 152 when location information includes a location associated with the motor vehicle. The location information may be obtained by from incoming connection request. The location information may comprise a location of a nearest base station of a long-range wireless communication network associated with the portable electronic device or a location of the portable electronic device 100. The location of the nearest base station may be provided by the wireless network 150. The location of the portable electronic device 100 may alternatively be determined by triangulation using locations of base stations of the wireless network 150, a global positioning system (GPS) information of the portable electronic device 100, or other location services.

Any active connections via the short-range wireless communication path are disconnected 404 after a hands-free device 152 is detected. Optionally, any active connections may be disconnected when the portable electronic device 100 is detected within the threshold distance of the motor vehicle. The active connections may include connections between the portable electronic device 100 and a docketing station, stereo, radio, and so forth. Alternatively, the hands-free device 152 may detect any active connections via the short-range wireless communication path.

The detected hands-free device 152 is connected 406 to the portable electronic device 100 via the short-range wireless communication path. Hands-free operation between the portable electronic device 100 and the detected hands-free device 152 is engaged 408.

The method of FIG. 4 may optionally include inhibiting the portable electronic device 100 from transmitting communications. The inhibiting may occur after detecting the hands-free device or association with a motor vehicle. The method of FIG. 4 may also comprise inhibiting hands-on operation and re-establishing hands-on operation when bypass information for re-establishing hands-on operation is received, as described above.

Figure 5:
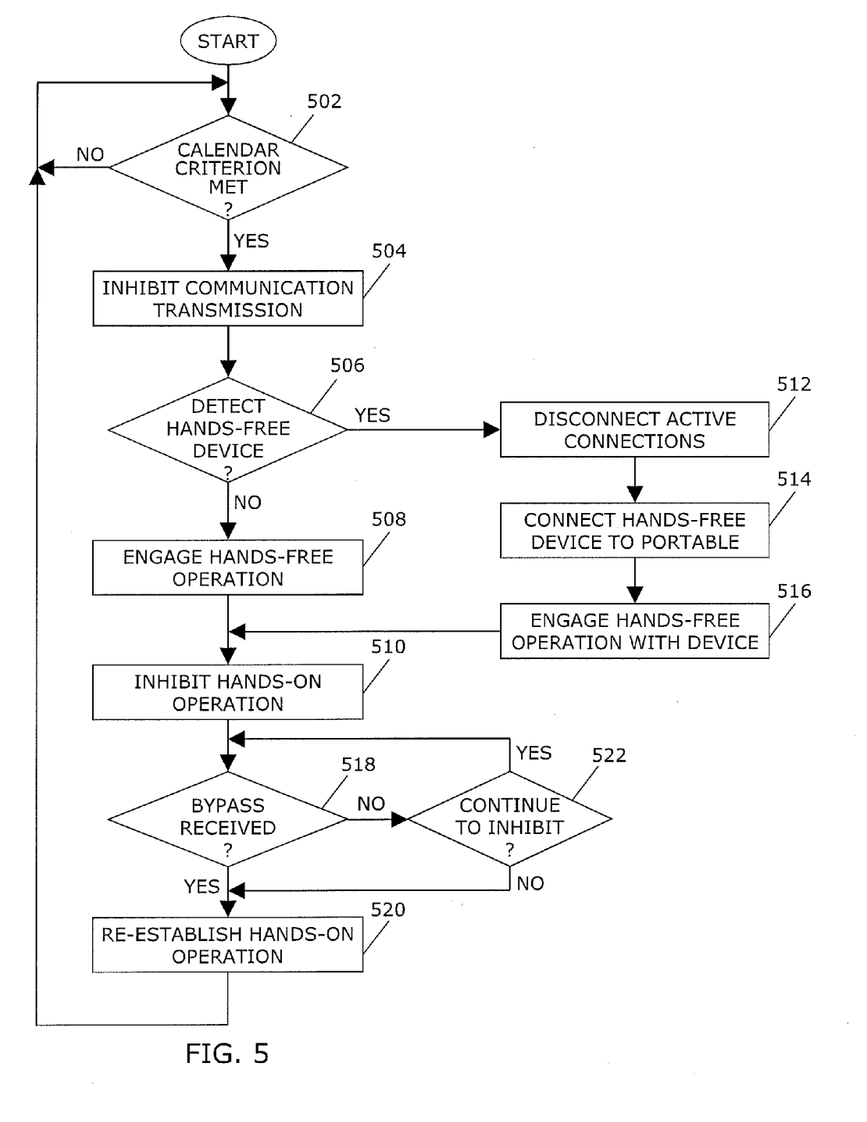

A flowchart illustrating a further example embodiment of a method of hands-free operation of a portable electronic device 100 in a motor vehicle is shown in FIG. 5. In this embodiment, operation, e.g., hands-free, of the portable electronic device 100 is calendar-based. Information other than calendar information may be utilized to provide criterion, such as time data, weather data, user profile or preferences, other hands-free suitability data, and so forth. The method may be carried out by software executed, for example, by the processor 102. Coding of software for carrying out such a method is within the scope of a person of ordinary skill in the art given the present disclosure. The method may contain additional or fewer processes than shown and/or described, and may be performed in a different order. Computer-readable code executable by at least one processor 102 of the portable electronic device 100 to perform the method may be stored in a computer-readable medium such as the memory 110. The computer-readable code may be part of the operating system 146, a part of an application, or a stand-alone application.

A determination of whether at least one calendar criterion is met 502 may include identifying current calendar information, such as time and date, and one or more calendar-based criteria. The calendar criteria may be, for example, days, dates and times, calendar events scheduled in the calendar application, and so forth. Specific calendar criteria may include Monday through Friday from 9 AM to 5 PM, work-related events, late-night hours, social events, and so forth. Multiple criteria may be stored. Calendar criteria may be recurring, such as every Saturday, the first Thursday of each month, and so forth. Opt-outs for calendar criteria may also be included, such as for holidays, vacation, business trips, and so forth. The calendar criteria may be stored locally on the portable electronic device 100, remotely, or any combination thereof. When the criterion is Tuesday from 9 AM to 5 PM, the calendar criterion is met beginning at 9 AM each Tuesday.

The portable electronic device 100 is inhibited 504 from transmitting communications, for example, as described above. The portable electronic device 100 may simply inhibit communication transmission, e.g., processes other than 502 and 504 are not performed, one or more of the remaining processes in the flowchart may be optional, and so forth.

When a hands-free device 152 is detected, active connections may be disconnected 512, the hands-free device 152 may be connected 514 via a short-range communication path to the portable electronic device 100, and hands-free operation engaged 516. Otherwise, hands-free operation 508 may be engage. Hands-on operation may be inhibited 508. Detected or received 518 bypass information may re-establish hands-on operation. Inhibiting of transmissions may be discontinued 522. The processes are described above.

The portable electronic device 100 may be configured to engage hands-free operation, for example, according to information technology (IT) policy. IT policy may be utilized to control at least a part of the operation of portable electronic devices 100 and may be issued by an IT administrator of an organization that provides at least some of the communication services to portable electronic devices 100 via the wireless network 150. IT policy may be stored in memory 110 in a protected area that is tamper-resistant. IT policy may be pushed to supported portable electronic devices 100 when an IT policy change occurs. Enterprises may utilize IT policy to impose hands-free operation on the enterprise's portable electronic devices 100, for example, with predetermined parameters such as dates and/or times of hands-free operation. Individual users may choose whether to engage the hands-free operation via device settings rather than IT policy.

The portable electronic devices 100 may alternatively be configured to engage hands-free operation unless bypass information is detected, such as described above, or the bypass information may be simpler, such as a combination of input device actuations, e.g., holding a volume control while depressing another control such as a trackball, trackpad, touch-sensitive display 118, and so forth. Hands-free operation is activated similar to a dead man's switch that is engaged unless bypass information is detected. This process facilitates, e.g., passengers preventing hands-free operation from being engaged.

The processes described above may be performed independently of each other, may be combined, and may be performed in parallel and/or sequentially with each other.

The present disclosure may be embodied in other specific forms without departing from its spirit or essential characteristics. The described embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A method comprising:
   detecting when a portable electronic device is within a threshold distance of a motor vehicle;
   inhibiting the portable electronic device from transmitting communications when the portable electronic device is within the threshold distance of a motor vehicle;
   inhibiting hands-on operation of the portable electronic device after engaging hands-free operation;
   re-establishing hands-on operation of the portable electronic device when input to re-establish hands-on operation is received.

2. The method of claim 1, wherein the input comprises bypass information.

3. The method of claim 1, wherein the input comprises a first code when the portable electronic device is in hands-free operation, wherein the input is a second code when the portable electronic device is not in hands-free operation.

4. The method of claim 1, further comprising:
   when in hands-free operation and the input is entered is less time than a first time threshold, re-establishing hands-on operation;
   when not in hands-free operation and the input is entered in less time than a second time threshold, re-establishing hands-on operation;
   wherein the first time threshold is shorter than the second time threshold.

5. The method of claim 1, further comprising, before re-establishing hands-on operation when the portable electronic device is in hands-free operation, wherein hands-on operation is re-established when confirmation input is detected.

6. The method of claim 1, further comprising:
   when a hands-free device is detected, disconnecting any active connection via a short-range wireless communication path, connecting the portable electronic device to the hands-free device via the short-range wireless communication path, engaging hands-free operation between the portable electronic device and the hands-free device.

7. The method of claim 6, wherein the detecting comprises:
   receiving an identifier of the hands-free device;
   comparing the identifier to one or more identifiers of hands-free devices;
   detecting the hands-free device when the received identifier includes one of the one or more identifiers of hands-free devices.

8. The method of claim 7, wherein the received identifier is a device name.

9. The method of claim 7, wherein the received identifier is a Media Access Control address.

10. The method of claim 6, wherein the detecting comprises:
    receiving an incoming connection request from a wireless device via the short-range wireless communication path;
    detecting the hands-free device when an input is received during the incoming connection request.

11. The method of claim 10, wherein the input comprises information received from a near field communication (NFC) device.

12. The method of claim 6, wherein the detecting comprises:
    receiving an incoming connection request from a wireless device via the short-range wireless communication path;
    detecting the hands-free device when location information includes a location associated with a motor vehicle.

13. The method of claim 12, wherein the location information comprises a location of a nearest base station of a long-range wireless communication network associated with the portable electronic device.

14. The method of claim 12, wherein the location information comprises a location of the portable electronic device.

15. The method of claim 1, further comprising pairing the portable electronic device with the hands-free device, the pairing including:
    receiving identifying information from the hands-free device on the portable electronic device;
    receiving data specifying whether the hands-free device is associated with a motor vehicle;

storing the identifying information and the data in the portable electronic device.

16. The method of claim 1, further comprising:
inhibiting the portable electronic device from transmitting communications when at least one calendar criterion is met;
when a hands-free device is detected, performing at least one of: disconnecting any active connection via the short-range wireless communication path, connecting to the hands-free device via the short-range wireless communication path, and engaging hands-free operation between the portable electronic device and the hands-free device.

17. A method comprising:
detecting a hands-free device associated with a motor vehicle;
when the hands-free device is detected, disconnecting, by a portable electronic device, any active short-range wireless connection between the portable electronic device and another electronic device via a short-range wireless communication path;
connecting the portable electronic device to the hands-free device via the short-range wireless communication path.

18. A method comprising:
detecting when a motor vehicle is within a threshold distance of a portable electronic device;
inhibiting the portable electronic device from transmitting communications when the motor vehicle is within the threshold distance of the portable electronic device.

19. The method of claim 18, wherein the detecting comprises detecting when the portable electronic device is outside the motor vehicle.

20. The method of claim 18, wherein the detecting comprises detecting when the portable electronic device crosses the threshold distance.

* * * * *